US009882415B2

(12) United States Patent
Olgun et al.

(10) Patent No.: US 9,882,415 B2
(45) Date of Patent: Jan. 30, 2018

(54) WIRELESS CHARGING ARCHITECTURE FOR MOBILE COMMUNICATION DEVICE WITH SINGLE PIECE METAL HOUSING

(71) Applicant: Motorola Mobility LLC, Chicago, IL (US)

(72) Inventors: Ugur Olgun, Chicago, IL (US); Mohammed Abdul-Gaffoor, Palatine, IL (US); Abu T Sayem, Gurnee, IL (US); Hugh K Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 165 days.

(21) Appl. No.: 14/872,322

(22) Filed: Oct. 1, 2015

(65) Prior Publication Data

US 2017/0098951 A1   Apr. 6, 2017

(51) Int. Cl.
| | |
|---|---|
| *H02J 7/00* | (2006.01) |
| *H01F 27/42* | (2006.01) |
| *H02J 7/02* | (2016.01) |
| *H04B 5/00* | (2006.01) |
| *H02J 50/12* | (2016.01) |

(52) U.S. Cl.
CPC .............. *H02J 7/025* (2013.01); *H02J 50/12* (2016.02); *H04B 5/0037* (2013.01); *H04B 5/0081* (2013.01); *H02J 7/0042* (2013.01)

(58) Field of Classification Search
CPC .......... H02J 7/025; H02J 50/12; H02J 7/0042; H04B 5/0037; H04B 5/0081

USPC .......................................... 320/108; 307/104
See application file for complete search history.

(56) References Cited

U.S. PATENT DOCUMENTS

| | | | | | |
|---|---|---|---|---|---|
| 5,148,346 | A * | 9/1992 | Naab | .......................... | B63C 9/24 361/251 |
| 8,294,300 | B2 * | 10/2012 | Cook | ..................... | H01Q 1/248 307/104 |
| 8,666,459 | B2 * | 3/2014 | Matsui | ................... | H01Q 1/243 320/108 |
| 9,461,500 | B2 * | 10/2016 | Tseng | ...................... | H02J 7/025 |
| 2010/0279734 | A1 * | 11/2010 | Karkinen | ................ | H01Q 3/24 455/554.2 |
| 2012/0013294 | A1 * | 1/2012 | Yeh | ......................... | H02J 7/025 320/108 |
| 2017/0048649 | A1 * | 2/2017 | Olgun | ................... | H04W 4/008 |

\* cited by examiner

*Primary Examiner* — M'Baye Diao
(74) *Attorney, Agent, or Firm* — Miller, Matthias & Hull LLP

(57) ABSTRACT

Systems and methods for providing resonant wireless charging in a portable communications device utilize antenna arms formed from openings in a metal unibody construction. Two of the antenna arms are driven by WiFi, GPS, and cellular drives respectively, while a wireless charging antenna sharing the same mechanical connections provides a differential drive across the antenna ends, forming a primary wireless charging coil. In an embodiment, a smaller multi-turn coil is connected to the primary wireless charging coil, and may overlay a device speaker and may also be shielded by a ferrite material. This structure or a dedicated similar structure on the device is then used for resonance-based wireless charging of the device.

20 Claims, 9 Drawing Sheets

WIRELESS CHARGING ARCHITECTURE FOR MOBILE COMMUNICATION DEVICE WITH SINGLE PIECE METAL HOUSING

TECHNICAL FIELD

The present disclosure is related generally to wireless energy transfer technologies for mobile devices, and, more particularly, to a system and method for wireless charging in a mobile communication device having a metal housing.

BACKGROUND

In addition to WiFi, Global Positioning Systems (GPS), Near Field Communications (NFC), and cellular communications, mobile communication devices increasingly also provide a method for wireless charging. Wireless charging solutions are typically based on a multi-turn conductive loop (coil) that is configured to respond to magnetic fields. This multi-turn coil configuration is commonly nested within the NFC antenna structure.

A wireless charging coil is often placed behind the back housing of a mobile communication device. Portable communication devices such as cellular phones have typically incorporated a non-conductive back housing (e.g. plastic), or an appropriate opening in a conductive back housing, to allow an embedded wireless charging coil to freely operate. The opening is generally necessary, since otherwise the magnetic fields generated by the wireless power transmitter unit (drive coil) would be blocked and not reach to the receiver in the mobile device. In essence, the receptive coil would be trapped between the conductive internal components of the mobile device and the conductive housing. Thus, internal wireless charging coils typically require an open (nonconductive) path through the back of the device.

In an effort to deliver more premium electronic devices to consumers, cellular phone manufacturers are increasingly employing exterior housings fabricated from metal alloys. In addition, mobile communication devices are handled frequently, and plastic housings are weaker than metal ones of similar thickness, hence allowing more frequent damage and breakage. Similarly, a metal housing with an opening over an internal wireless charging coil is still weaker than a unibody metal construction, is more expensive and complex to manufacture than a unibody construction, and is aesthetically less pleasing than a unibody construction.

Before proceeding, it should be appreciated that the present disclosure is directed to a system that can eliminate some of the shortcomings noted in this Background section. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art. Moreover, the identification herein of desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
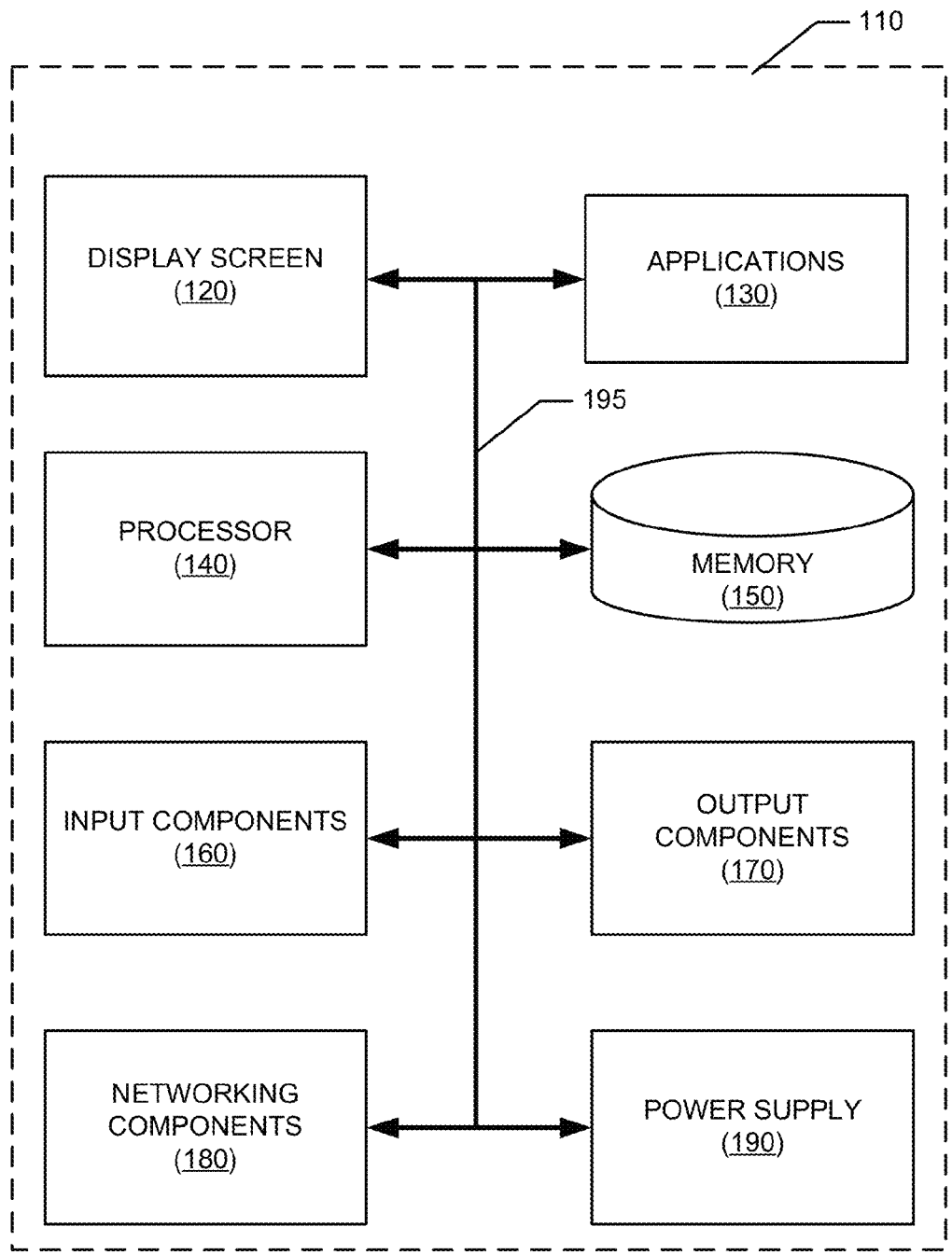
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, existing portable communication devices generally incorporate a plastic housing, or an opening in a conductive housing, to allow an embedded wireless charging coil of the device to freely communicate. Both of these techniques ensure that the magnetic fields induced by wireless power transmit unit (drive coil) may couple into the wireless charging coil (device coil) embedded in the mobile device. However, both of these approaches result in a housing that is weaker and more expensive than one constructed from a metal unibody.

In an embodiment of the disclosed principles, a mobile communication device is provided having a single-piece metal housing with openings at both ends. The openings on the housing form a plurality of arms that function as antennas in the finished device, with the remainder of the housing serving as a ground reference. In an example wherein four such arms are included, the housing may be configured with two arms at one end of the housing (e.g. the upper edge) and two arms at the opposite end of the housing (e.g., the lower edge). Various ones of these antennas may be used for GPS geo-location services, WiFi communications, NFC, cellular communications or a combination of these.

In addition to such uses, such a loop structure is also employed to provide wireless charging for the device in an embodiment of the disclosed principles. In particular, as will be discussed in greater detail, resonant coupling is used in an embodiment to couple a power signal into a low-inductance loop structure. In a further embodiment, the real impedance of the device coil is matched to the real impedance of the driving coil. The driving coil may be located within a table, desk, shelf or other convenience surface whereupon a device may be placed for wireless charging.

In an embodiment, the device charging coil may be located at the opposite end of the device from the NFC coil. In this way, a portable communications device having a unibody metal back housing may nonetheless support wireless charging as well as WiFi, GPS, cellular, and NFC capabilities.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown in detail in FIG. 1, the device 110 includes software and hardware networking components 180 to allow communications to and from the device. Such networking components provide wireless networking functionality, although wired networking may additionally or alternatively be supported. In an embodiment, as noted above, the networking components 180 include an NFC antenna.

In an embodiment, a power supply 190, such as a battery or fuel cell, may be included for providing power to the device 110 and its components. In an embodiment, as noted above, the power supply 190 include a wireless charging coil antenna. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
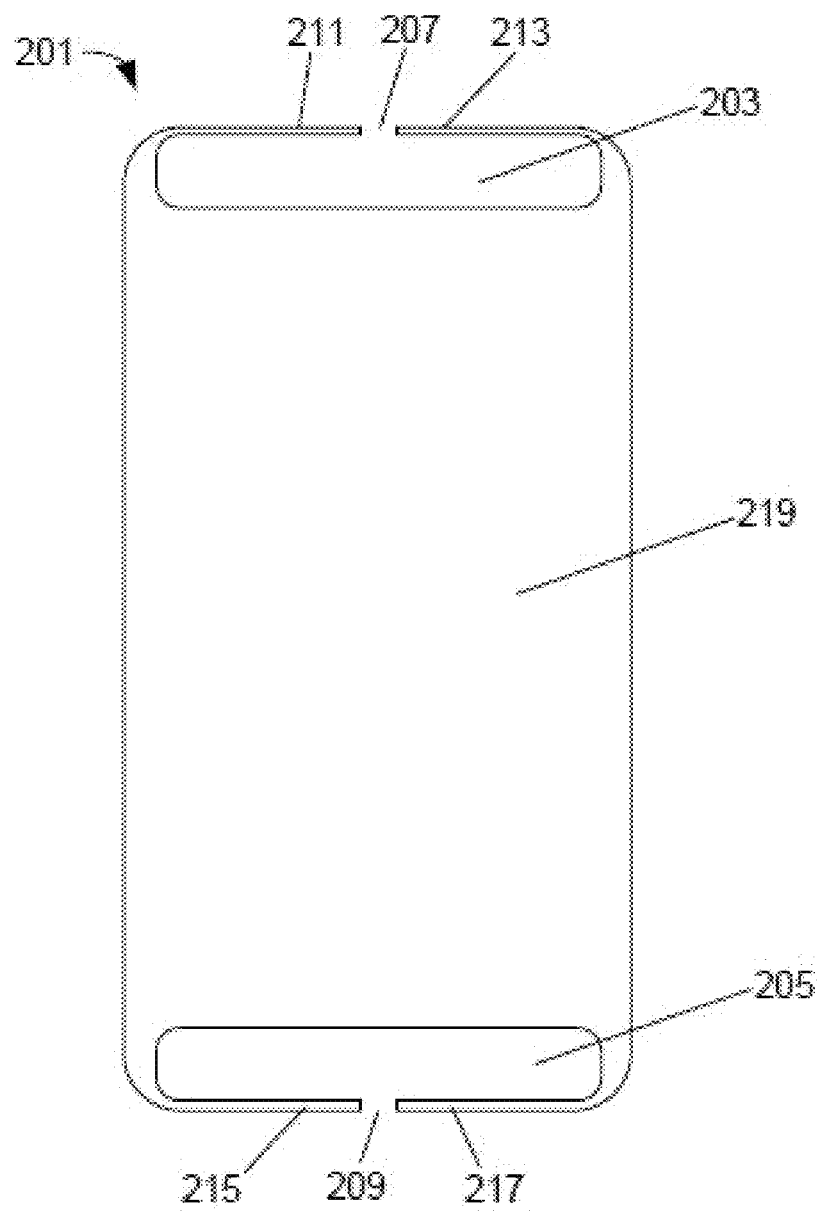
FIG. 2 is a plan view of a one-piece metal back housing in accordance with an embodiment of the described principles.

Turning to FIG. 2, this figure shows a metal unibody housing 201 for a portable communication device such as device 110 of FIG. 1. It will be appreciated by those of skill in the art that the illustrated housing is simply an example, and that other configurations of unibody housing may be used. That said, in the illustrated example, the metal housing 201 is formed having a first opening 203 and a second opening 205, with the first opening 203 being located in the upper portion of the metal housing 201 and the second opening 205 being located in the lower portion of the metal housing 201.

In addition, a first break 207 is located in the top of the metal housing 201, causing the first opening 203 to be non-closed. Similarly, a second break 209 located in the bottom of the metal housing 201 causes the second opening 205 to be non-closed. The result of the first opening 203 and second opening 205, in conjunction with the first break 207 and second break 209 respectively, is that two antenna arms are formed at each of the top and the bottom respectively of the metal housing 201.

In particular, a pair of antenna arms 211, 213 is formed at the top of the metal housing 201 and another pair of antenna arms 215, 217 is formed at the bottom of the metal housing 201. The remainder of the metal housing 201 may be referred to herein for clarity when required as the main body 219 of the metal housing 201. The antennas 211, 213, 215 and 217 may be referred to herein as antenna 1 (ant-1), antenna 2 (ant-2), antenna 3 (ant-3) and antenna 4 (ant-4).

In a typical implementation, top antennas such as the ant-1 and ant-2 antennas (211, 213) in the illustrated example, may be used for GPS geo-location services, WiFi communications, and cellular communications, while the bottom antennas such as the ant-3 and ant-4 antennas (215, 217) may be dedicated to support cellular communications. It will be appreciated by those of skill in the art that other antenna assignments may be used instead.

In an embodiment, at least two of the available antennas are reused to provide wireless charging functionality. In one particular embodiment, for example, the two bottom antennas ant-3 (215) and ant-4 (217) may be differentially driven to form a single turn loop antenna surrounding the bottom opening 209. The effective circuit configuration of this architecture, including cellular communications, is shown schematically in FIG. 3. As seen, the device may include a cellular transceiver 303 that may be linked to ant-3 (215) and ant-4 (217). It will be appreciated that the ant-3 and ant-4 may operate at different frequencies and their operating band and technology may be controlled by the cellular transceiver 303.

Figure 3:
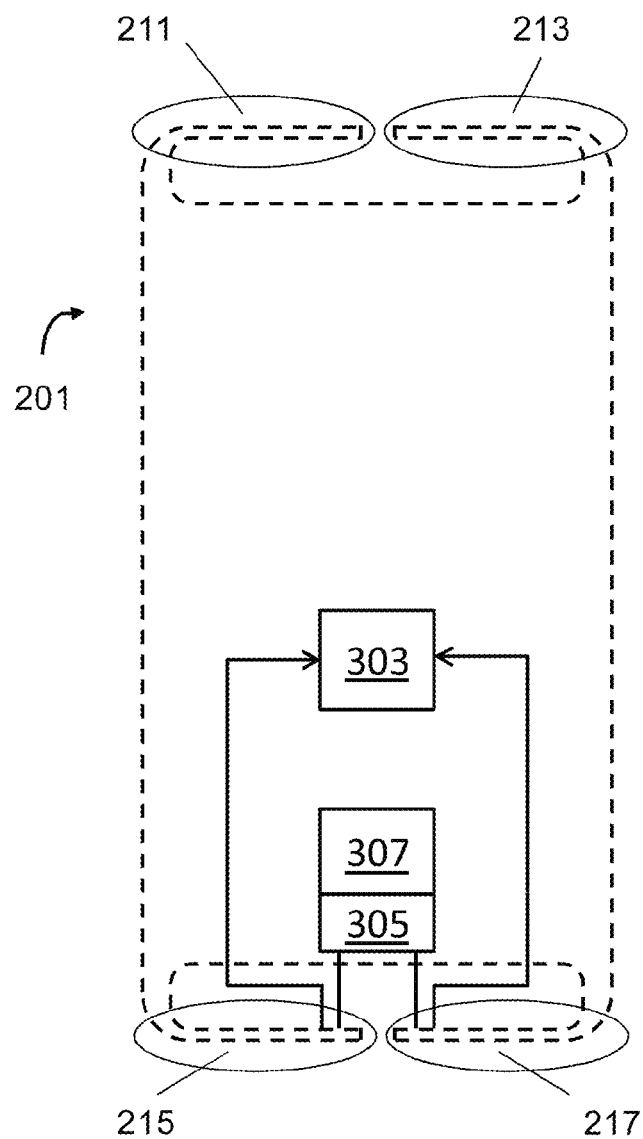
FIG. 3 is an overview diagram of cellular transceiver and wireless charging circuitry and their connection to the antennas in accordance with an embodiment of the disclosed principles.
Figure 3:
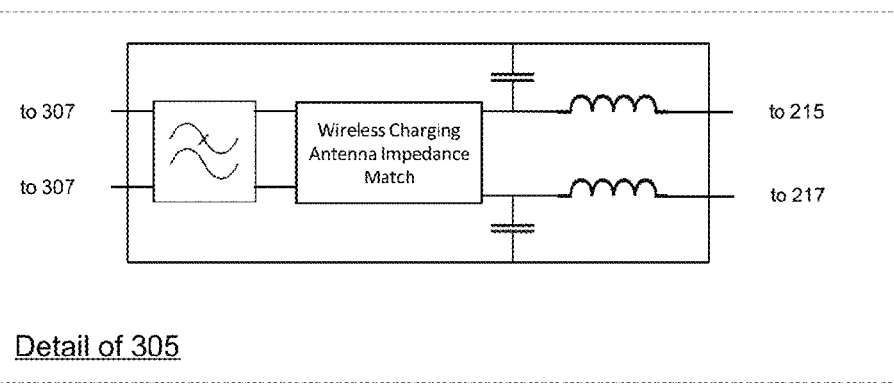

In the illustrated embodiment presented in FIG. 3, a differential charging circuit 305 for wireless charging is shown. The differential charging circuit 305 is linked to the power management controller 307 (part of 190), which handles the communication between the device coil and drive coil circuitry and determines when the mobile device no longer needs charging or how fast it needs to be charged. The differential charging circuit 305 is also linked to both ant-3 (215) and ant-4 (217), with each antenna forming a respective side of the differential, and in essence, creating a single turn loop antenna for wireless charging. Thus, the differential charging circuit 305 contains components to decouple the wireless charging system from the cellular transceiver.

Figure 4:
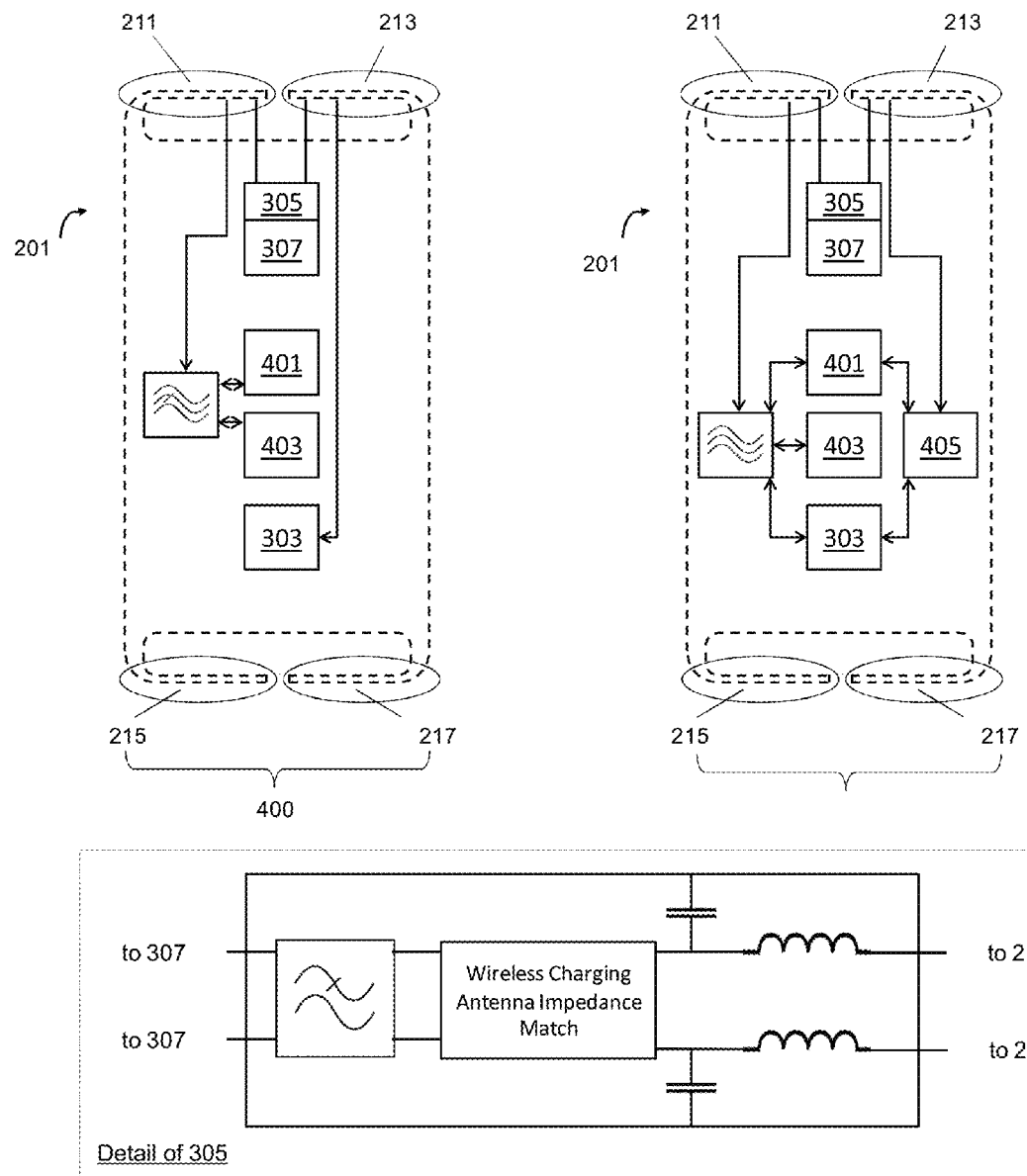
FIG. 4 is an overview diagram of GPS receiver, WiFi and cellular transceivers and wireless charging circuitry and their connection to the antennas in accordance with an embodiment of the disclosed principles.

In another embodiment, for example, the two top antennas ant-1 (211) and ant-2 (213) may be differentially driven to form a single turn loop antenna surrounding the top opening 207. The effective circuit configuration of this architecture, including WiFi, GPS, and cellular communications, is shown schematically in FIG. 4. As can be seen, in one embodiment 400, the device may include a WiFi transceiver 401 and a GPS receiver 403 linked to ant-1 (211) via a diplexer. The device may also include a cellular transceiver 303 which may be linked to ant-2 (213), which operates at a different frequency than that used by the WiFi transceiver 401 and GPS receiver 403. Similarly in another embodiment 202, a WiFi transceiver 301, a GPS receiver 403 and a cellular transceiver 303 may be linked to ant-1 (211) via a triplexer. The device may also include a secondary WiFi transceiver and it may share ant-2 (213) with the cellular transceiver via high band antenna switching modules 405. Note that in this embodiment, differential charging circuit 305 is linked to ant-1 and ant-2, with each antenna forming a respective side of the differential, and in essence, creating a single turn loop antenna for wireless charging. Thus, the differential charging circuit 305 contains components to decouple the wireless charging system from the GPS receiver, WiFi transceiver, and cellular transceiver. It will be appreciated that the device need not implement GPS, WiFi and cellular communications via the top antennas 211, 213; rather, the example of FIG. 4 is given to illustrate the fact that, in an embodiment of the disclosed principles, the use of either or both of the top antennas for GPS, WiFi or cellular communications does not interfere with their use for wireless charging applications. Similarly, the use of both of the top antennas for wireless charging does not interfere with their use for GPS, WiFi or cellular communications.

Figure 5:
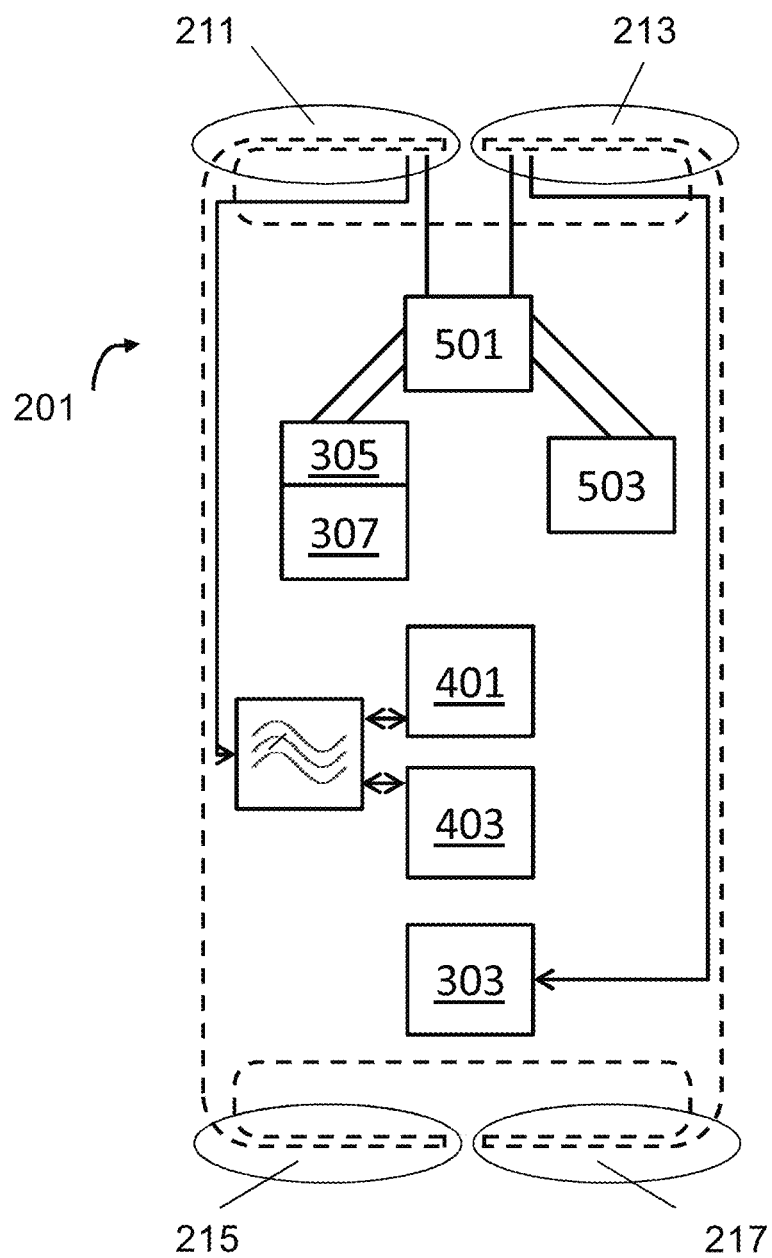
FIG. 5 is an overview diagram of GPS receiver, WiFi, NFC, and cellular transceivers and wireless charging circuitry and their connection to the antennas in accordance with an embodiment of the disclosed principles.

In a different embodiment, for example, the two top antennas 211 and 213 may again be differentially driven to form a single turn loop antenna surrounding the top opening 207 and used for both wireless charging and NFC. The effective circuit configuration of this architecture, including WiFi, GPS, and cellular communications, is shown schematically in FIG. 5. As can be seen, the device may include a switch module 501 to determine a use case for the single turn loop antenna created by ant-1 (211) and ant-2 (213). In essence, the switch module may provide time duplexing to support both the wireless charging system (305 and 307) and the NFC system (503).

Figure 6:
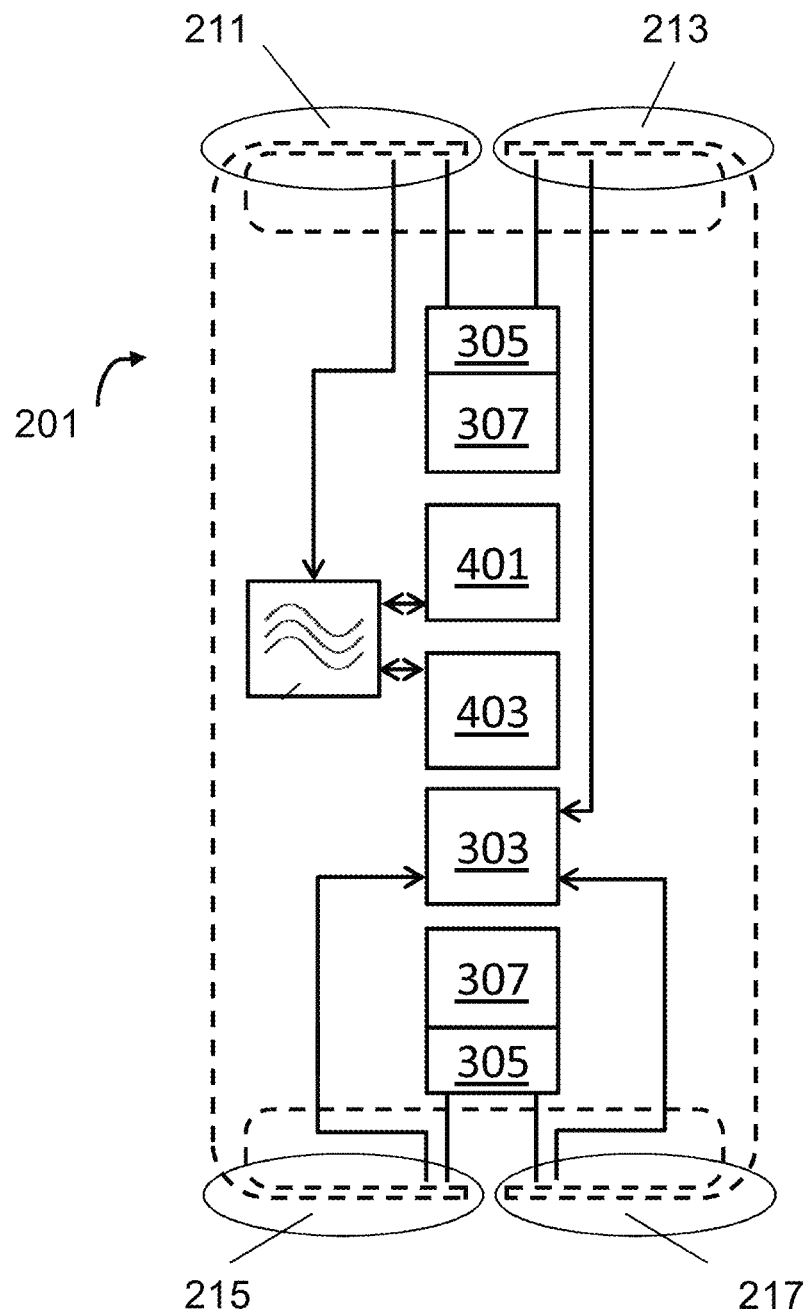
FIG. 6 is an overview diagram of two wireless charging circuits and their connection to the antennas in accordance with an embodiment of the disclosed principles.

In another embodiment, for example, the two top antennas 211 and 213 may again be differentially driven to form a single turn loop antenna surrounding the top opening 207. In addition, the two bottom antennas 215 and 217 may also be differentially driven to form a single turn loop antenna surrounding the bottom opening 209. The effective circuit configuration of this architecture, including WiFi, GPS, and cellular communications, is shown schematically in FIG. 6. As can be seen, both of these single turn loop antennas may be connected to their own dedicated wireless charging circuitry and the power supply unit (190) may combine the harvested energy by these circuit components (305 and 307) and recharge the battery accordingly.

The frequency at which wireless charging signals are generated is set by various relevant standards, such as Qi standard or REZENCE standard. The frequency used for Qi chargers is located between about 110 and 205 kHz for the low power Qi chargers up to 5 watts and 80-300 kHz for the medium power Qi chargers. The power transmission frequency for REZENCE chargers on the other hand is 6.78 MHz. Meanwhile, NFC devices operate at 13.56 MHz. The frequency band at which GPS signals are received by mobile devices is centered at 1.575 GHz. Similarly, WiFi transceivers communicate on frequency bands that are centered at 2.45 GHz and 5.2 GHz and cellular transceivers communicate between the frequencies of 500 MHz and 3 GHz.

The spectral separation between the operating frequency of the wireless charging system and the GPS, WiFi, and cellular systems allows for a simple decoupling mechanism consisting of an inductor and a capacitor. As shown in FIG. 3 and FIG. 4, a set of inductors placed between the wireless charging antenna impedance match and the physical connections to RF antennas (211, 213, 215, and 217) may decouple the wireless charging system from the other transceivers using these antennas. Similarly, a series capacitor between the other transceivers and their respective antenna (ant-1, ant-2 or both depending on the embodiment) may decouple these transceivers from the wireless charging system. Similarly, decoupling between the wireless charging system and NFC system could be accomplished using switching to toggle between these two different functions as needed. Those skilled in the art may appreciate that the decoupling can also be achieved in numerous other ways.

Figure 7:
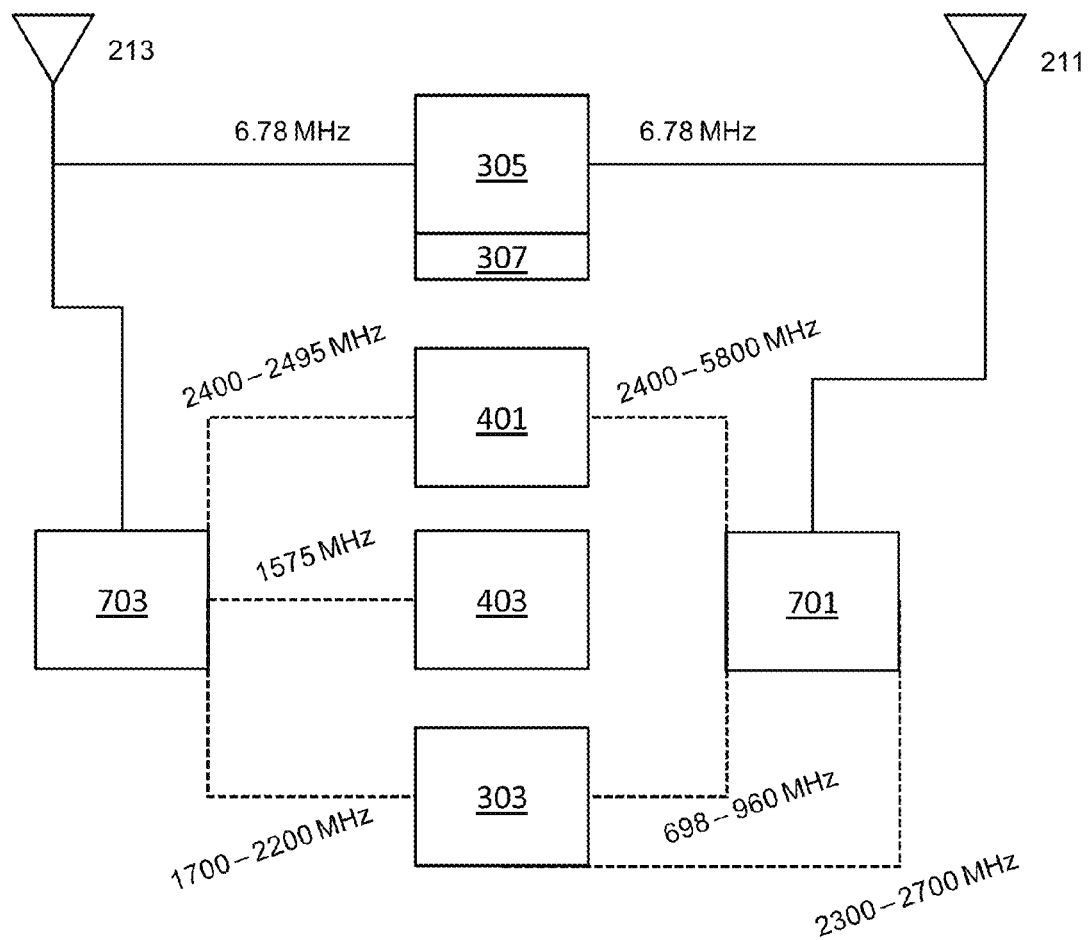
FIG. 7 is a modular schematic of WiFi, GPS, cellular transceivers and wireless charging circuitry and their connection to the antennas in accordance with an embodiment of the disclosed principles.

FIG. 7 shows a modular schematic for implementing the architectures shown in FIG. 4. Although those of skill in the art will appreciate that other circuit constructions may be used to implement the disclosed principles, FIG. 7 provides an example to clarify operation of the system for those of skill in the art as well as those of more casual acquaintance with the art.

In the illustrated implementation, the WiFi transceiver 401, the GPS receiver 403, and the cellular transceiver 303 are linked to a dedicated antenna via a multiplexer 703. Multiplexer 703 may route the incoming GPS signals in 1575 MHz band to the GPS receiver, WiFi signals in 2400-2495 MHz band to the WiFi transceiver, and cellular signals in 1700-2200 MHz band to the cellular transceiver. The dedicated antenna may be, for example, ant-2 (213). The other antenna 211 is linked to the WiFi transceiver 401 and also to the cellular receiver 303 through a high band antenna switch module 701 or the like. In this way, incoming low-band cellular signals such as those in 698-960 MHz band and high-band cellular signals such as those in the 2300-2400 MHz band and the 2500-2690 MHz band are switched to the cellular transceiver 303. Similarly, incoming 2400 MHz (2.4 GHz) WiFi signals are switched to the WiFi transceiver 401.

These bands are similar enough to be supported by the same physical antenna structure (211 and 213) while also being distinct enough to be efficiently separated at the switch module 701 or at the multiplexer 703. The switch module operates to allow both outgoing 2.4 GHz WiFi signals and outgoing high band cellular signals to share a single antenna 213. Alternatively, rather than switching inputs, the cellular transceiver 303 and WiFi transceiver 401 may also be multiplexed to and from the shared antenna 213. Similarly, cellular transceiver 303, WiFi transceiver 401, and GPS receiver 403 may be multiplexed to and from the shared antenna 211. In general, the cellular transceiver 303 will have priority with respect to usage of a shared antenna in a switched module based embodiment.

The differential charging circuit 305 for the wireless charging system is shown linked between ant-3 (215) and ant-4 (217) in one embodiment, and linked between ant-1 (211) and ant-2 (213) in another embodiment. The differential charging circuit 305 is part of, or is controlled by, a power management unit 307, which is part of 190. Given the frequency difference between wireless charging systems and WiFi or cellular communications and the existence of LC based decoupling circuitry, the use of ant-1 and ant-2 or ant-3 and ant-4 to provide wireless charging functionality does not affect the use of these antennas for WiFi, GPS or cellular signal reception and transmission.

Figure 8:
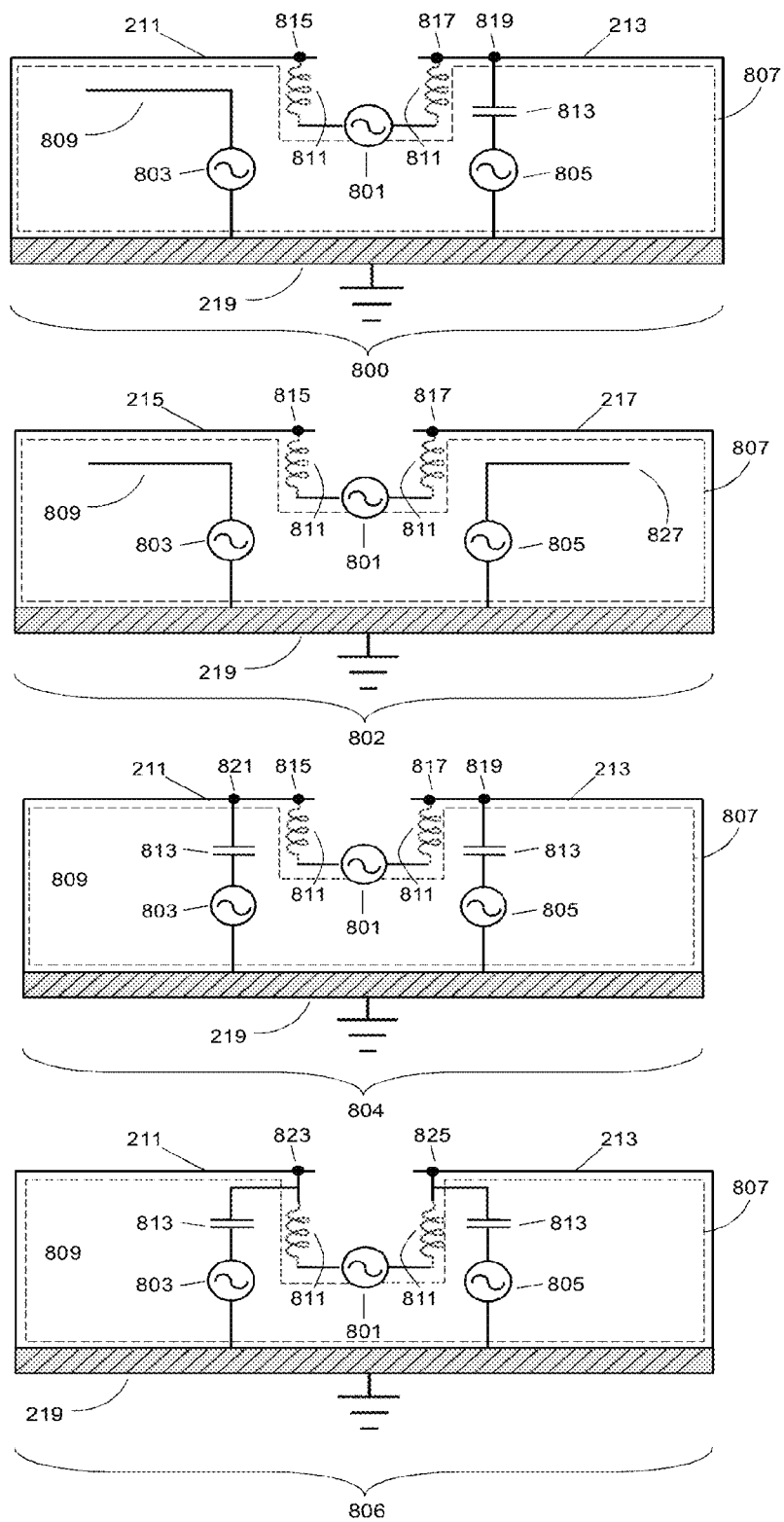
FIG. 8 is a collection of circuit level diagrams of a top antenna drive configuration, a bottom antenna drive configuration, an alternative top antenna drive configuration and a compact top antenna drive configuration in accordance with embodiments of the disclosed principles.

The circuit schematics 800, 802, 804, 806 of FIG. 8 illustrate more precisely the manner in which the antennas 211, 213, 215, and 217 may be repurposed for wireless charging. In the illustrated example 800, ant-1 (211) is excited via coupling from a nearby trace 809 which is linked to the antenna drive 803. Similarly, in the illustrated example 802, ant-3 (215) and ant-4 (217) are both excited via coupling from a nearby trace 809 and 827 which are linked to the antenna drives 803 and 805, respectively. Note that in another illustrated example 804, ant-1 (211) is excited directly by antenna drive 803 via a mechanical connection 821. In embodiments where antenna drive 803 is directly connected to the ant-1 (such as 804 and 806), a decoupling capacitor 813 is connected in series with the antenna drive 803. The purpose of the series capacitor is to block the energy that is intended for the wireless charging drive (device coil) 801 from coupling into the antenna drive 803.

In one embodiment, the drives 803 and 805 may be connected directly to the cellular transceiver (FIG. 3) or in another embodiment they may be connected to the WiFi transceiver 401, GPS receiver 409 and cellular transceiver 303 (FIG. 4). The antenna drives 803 and 805 are referenced to ground, as provided by the main body 219 of the metal housing 201. As mentioned earlier, a decoupling capacitor 813 is connected in series with the antenna drive 805 in embodiments where 805 is mechanically connected to the antennas. The purpose of the decoupling capacitor is again to route the incoming wireless charging energy to the intended antenna drive 801. In one embodiment, antenna drive 805 may be connected to a cellular transceiver 303 (FIG. 3 and FIG. 4) and also to a WiFi transceiver through a switch 401 (FIG. 4). Note that in another embodiment (not shown but similar to 802), ant-2 may be excited by a nearby trace that is connected to the antenna drive 805. In this case, a series decoupling may not be necessary since the antenna drive 805 would be physically disconnected from ant-2.

In certain embodiments, wireless charging loop 807 is created by both antennas 211, 213 and the main body 219 of the metal housing 201 and it is differentially excited at the gap between the antennas 211, 213. In other embodiments, wireless charging loop 807 is created by both antennas 215, 217 and the main body 219 of the metal housing 201 and it is differentially excited at the gap between the antennas 215, 217. The wireless charging drive 801 is exciting one side (211 or 215) with one pole of the differential feed and is exciting the other side (213 or 217) with the other pole of the differential feed. The wireless charging drive 801 and decoupling inductors 811 are part of the differential charging circuit 305, which is subsequently connected to the power management unit 307 (FIG. 3 and FIG. 4). In the embodiments shown in FIG. 8, decoupling inductors 811 are employed to block the electromagnetic energy produced by antenna drives 803 and 805 from coupling into the wireless charging drive 801.

In the embodiments 800 and 804 of FIG. 8, the NFC antenna drive 801 is connected to ant-1 via a mechanical connection 815 and to ant-2 via a mechanical connection 817. In the latter embodiment (804), the antenna drive 803 is connected to ant-1 via a mechanical connection 821 and the antenna drive 805 is connected to ant-2 via a mechanical connection 819. In the embodiment 806, the mechanical connections 815 and 821 are combined into 823, while keeping the decoupling inductors and capacitors in place. Similarly, mechanical connections 817 and 819 are combined into 825. Thus, the number of mechanical connections to the top antennas is reduced from four to two without compromising the antenna performance. This reduction translates into valuable physical space savings and reduced manufacturing cost.

In the illustrated configurations, and with respect to NFC communications, the device 110 is enabled to operate as an NFC card emulator, an NFC card reader or an NFC peer. In the first case, the device 110 responds to NFC polling pulses from an external source by emitting an NFC response mimicking a particular NFC card. In the second case, the device 110 polls an NFC card (actual or emulated) and receives and processes an appropriate NFC response. In the last case, the device communicates with another NFC enabled device via the transmission and reception of NFC transmissions.

Figure 9:
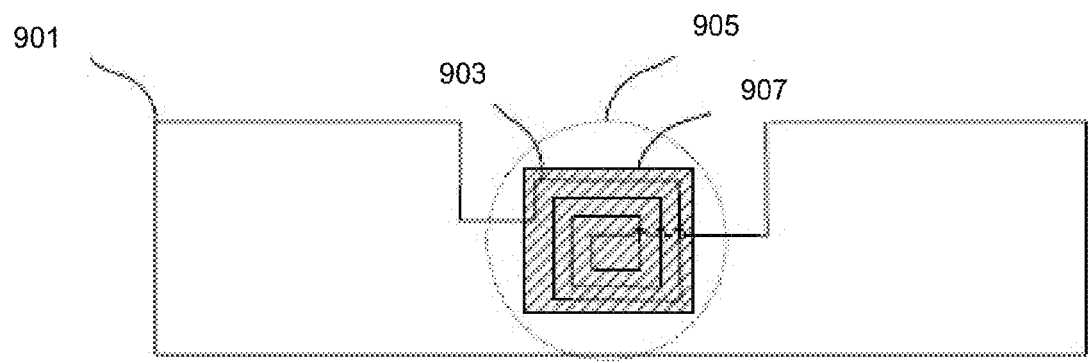
FIG. 9 is a circuit view of a coil configuration used to implement a wireless charging antenna in accordance with an embodiment of the disclosed principles.

Because the wireless charging coil path 807 shown in dashed outline makes only a single turn, its inherent inductance may be less than ideal. Therefore, in an embodiment, the physical layout of the wireless charging coil 807 employs a smaller physical loop along the larger path that is shown in dashed outline in FIG. 8. The smaller loop 903 and its relationship to the larger loop 901 are shown in FIG. 9.

This smaller loop 903 not only increases the inherent inductance of the wireless charging coil, but also its placement between ant-1 (211) and ant-2 (213) or between ant-3 (215) and ant-4 (217) reduces the likelihood of a null in the near magnetic field.

As can be seen, the larger loop 901, corresponding to the dashed path 807 of circuits 800, 802, 804 and 806, connects in series to a smaller loop 903 having the same orientation. The multi-turn smaller loop 903 increases the inductance of the wireless charging coil substantially over that of the single-turn larger loop 901 alone.

In one embodiment, the smaller loop 903 is positioned in the central upper section of the device where it overlies an audio speaker 905 of the device (FIG. 4). In the illustrated example, the audio speaker 905 is shown by a circular dashed outline. With the smaller loop 903 overlaying the speaker 905, a ferrite shield 907 can be located beneath the smaller loop 903. This placement allows interference reduction between the internal metallic components of the device and the wireless charging operation. In addition, the metal provides shielding between the GPS, WiFi or cellular antennas in the vicinity and the lossy ferrite material in 907, thereby mitigating the potential performance deficiencies. In another embodiment (not shown), the smaller loop 903 can be positioned in the central lower section of the device where it overlies a USB connector of the device (FIG. 3). In such an embodiment, the smaller loop 903 may overlay the USB connector and a ferrite shield 907 can be located beneath the smaller loop 903 in between the loop 903 and the USB connector. Similarly, this placement also allows interference reduction between the internal metallic components of the device and the wireless charging operation.

In addition to providing enhanced NFC capabilities, the loop structure shown in FIG. 9 is employed in an embodiment to provide wireless charging for the device. In particular, the A4WP (REZENCE) protocol operates at 6.78 MHz, which corresponds to one half of the typical NFC frequency. As such, the A4WP protocol uses resonant coupling rather than inductive coupling, such that a low inductance device coil may be coupled if the real impedance of the device coil is matched to the real impedance of the driving coil. The driving coil may be located within a table, desk or shelf whereupon a device may be placed for wireless charging.

In an embodiment, the device charging coil is as shown in FIG. 9 but is located at the opposite end of the device from the NFC coil which is placed at the top. Moreover, a capacitance may be provided in series or parallel with the coil to match the real impedance of the device charging coil to that of the charging coil. In this way, a portable communications device having a unibody metal back housing may nonetheless support wireless charging as well as WiFi, GPS, cellular, and NFC capabilities.

It will be appreciated that various systems and processes for improving NFC antenna configuration and operation have been disclosed herein, along with methods and configurations for enabling wireless device charging. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
   a housing including a one-piece conductive housing, the one-piece conductive housing having an opening at each end having a distal border of each opening, and having a break in the distal border of each opening such that the broken distal border of each opening forms two antennas connected to the remainder of the one-piece conductive housing, first and second antennas being associated with one opening and third and fourth antennas being associated with the other opening;
   a cellular antenna drive connected to a first one of the antennas associated with a first one of the openings;
   a second cellular antenna drive connected to a second one of the antennas associated with the first opening; and
   a wireless charging circuit connected to a loop comprising both of the first and second antennas and the remainder of the one-piece conductive housing for receiving a wireless charging signal from a driving coil external to the device.

2. The portable electronic communication device in accordance with claim 1, further comprising a multi-turn secondary wireless charging loop connected to the primary wireless charging loop, linked to the wireless charging circuitry, in the same orientation as the primary wireless charging loop.

3. The portable electronic communication device in accordance with claim 2, further comprising a ferrite shield overlapping the secondary wireless charging loop.

4. The portable electronic communication device in accordance with claim 2, further comprising a USB connector overlapping the secondary wireless charging loop.

5. The portable electronic communication device in accordance with claim 1, wherein the primary wireless charging loop and the secondary wireless charging loop are configured for resonant coupling with the driving coil.

6. The portable electronic communication device in accordance with claim 1, wherein the wireless charging circuit is configured to receive power from the driving coil at about 6.78 MHz.

7. The portable electronic communication device in accordance with claim 1, wherein the wireless charging circuit is configured to utilize a REZENCE A4WP protocol.

8. The portable electronic communication device in accordance with claim 1, wherein the portion of the one-piece conductive housing located between the openings provides a reference ground.

9. A portable electronic communication device communication system comprising:
   a unibody metal housing;
   a first conductive loop formed in the unibody metal housing via an opening having a break forming two antennas connected to the remainder of the loop, and a cellular antenna drive connected to a first one of the antennas, a WiFi antenna drive connected with a second one of the antennas, and a differential NFC (near field communication) drive connected between the first and second antennas such that the first conductive loop forms an NFC antenna;
   a second conductive loop in the unibody metal housing via an opening having a break forming two antennas connected to the remainder of the loop; and
   a wireless charging circuit connected to the second conductive loop for receiving a wireless charging signal through the second conductive loop from a driving coil external to the device.

10. The portable electronic communication device communication system in accordance with claim 9, further comprising a multi-turn secondary wireless charging loop connected to the second conductive loop and having the same orientation as the second conductive loop.

11. The portable electronic communication device communication system in accordance with claim 9, further comprising a switching mechanism to route the incident magnetic energy to an NFC transceiver and wireless charging circuitry.

12. The portable electronic communication device in accordance with claim 10, further comprising an audio speaker overlapping the secondary wireless charging loop.

13. The portable electronic communication device communication system in accordance with claim 1 and claim 9, further comprising two wireless charging circuits, each on an opposite end of the device.

14. The portable electronic communication device communication system in accordance with claim 13, further comprising a power management system that can combine rectified energy from two different wireless charging circuits.

15. The portable electronic communication device communication system in accordance with claim 9, wherein the second conductive loop and the secondary wireless charging loop are configured for resonant coupling with the driving coil.

16. The portable electronic communication device communication system in accordance with claim 10, further comprising a wireless charging circuit connected to the second conductive loop and being configured to receive power from the driving coil at about 6.78 MHz.

17. The portable electronic communication device in accordance with claim 10, wherein the wireless charging circuit is configured to utilize a REZENCE A4WP protocol.

18. The portable electronic communication device communication system in accordance with claim 10, wherein a portion of the unibody metal housing between the openings provides a reference ground.

19. A portable communication device charging system comprising:
    a unibody conductive housing having an opening through the housing near an edge of the housing and a break in the edge of the housing causing the opening to form first and second arms connected to a remainder of the housing; and
    a wireless charging circuit connected across the first and second arms to form a loop and being configured to receive power from an external drive circuit in resonance with the loop.

20. The portable communication device charging system in accordance with claim 19, wherein the wireless charging circuit is configured to employ a REZENCE A4WP protocol.

* * * * *